United States Patent [19]

Sugiura et al.

[11] Patent Number: 4,614,159

[45] Date of Patent: Sep. 30, 1986

[54] POWDERED COAL BURNER

[75] Inventors: Saburo Sugiura; Kiyohide Hayashi, both of Nagoya; Kenji Kanada, Chita; Noboru Demukai, Kaizu; Tetsuo Okamoto, Chita, all of Japan

[73] Assignee: Daido Tokushuko Kabushiki Kaisha, Nagoya, Japan

[21] Appl. No.: 757,555

[22] Filed: Jul. 22, 1985

Related U.S. Application Data

[63] Continuation-in-part of Ser. No. 662,482, Oct. 19, 1984, abandoned.

[30] Foreign Application Priority Data

Oct. 19, 1983 [JP] Japan .................. 58-194423

[51] Int. Cl.$^4$ ................................ F23C 1/10
[52] U.S. Cl. ............................ 110/261; 110/263; 110/264; 110/265; 431/187
[58] Field of Search .................... 110/261–265; 431/187

[56] References Cited

U.S. PATENT DOCUMENTS

| | | | |
|---|---|---|---|
| 2,427,448 | 9/1947 | Duccini et al. | 110/261 |
| 2,669,511 | 2/1954 | Whitney, Jr. | 110/261 |
| 2,702,743 | 2/1955 | Totzek | 110/261 |
| 3,147,795 | 9/1964 | Livingston et al. | 110/261 |
| 3,393,650 | 7/1968 | Daman et al. | 110/261 |
| 4,147,116 | 4/1979 | Graybill | 110/264 |
| 4,221,174 | 9/1980 | Smith et al. | 110/265 |
| 4,321,034 | 3/1982 | Taccone | 110/264 |
| 4,333,405 | 6/1982 | Michelfelder et al. | 110/265 |
| 4,367,686 | 1/1983 | Adrian | 110/264 |
| 4,408,548 | 10/1983 | Schmalfeld et al. | 110/263 |
| 4,422,391 | 12/1983 | Izuha et al. | 110/263 |
| 4,428,727 | 1/1984 | Denssner et al. | 110/263 |
| 4,445,444 | 5/1984 | Espedal | 110/265 |
| 4,473,350 | 9/1984 | Gitman | 431/187 |
| 4,474,120 | 10/1984 | Adrian et al. | 110/261 |
| 4,480,559 | 11/1984 | Blaskowski | 110/263 |

Primary Examiner—Henry C. Yuen
Attorney, Agent, or Firm—Armstrong, Nikaido, Marmelstein & Kubovcik

[57] ABSTRACT

A powdered coal burner used for directly heating an object to be heated, particularly iron scrap, in a heating vessel. The burner is composed of an oxygen nozzle, a powdered coal nozzle, an air nozzle, disposed concentrically from the center, and a cone which is provided at the end of the opening part of the oxygen nozzle in such a way as to disperse oxygen in a radial direction and burn powdered coal. The burner burns with shortened length of flame, and temperature of the flame is not excessively high.

3 Claims, 4 Drawing Figures

POWDERED COAL BURNER

POWDERED COAL BURNER

This application is a continuation-in-art of application Ser. No. 662,482, filed Oct. 19, 1984, now abandoned.

BACKGROUND OF THE INVENTION

1. Field of the Invention

This invention relates to an improvement in a burner for burning powdered coal, and more particularly, to a burner suitable for directly heating an object to be heated in a heating vessel.

2. State of the Art

When, for instance, iron scrap is melted and refined to produce steel, it is preheated in a heating vessel before melting. The methods of preheating scrap are divided into two types: one is a low temperature type in which scrap is heated up to an average scrap temperature of 300° to 400° C., and the other is a high temperature type in which scrap is heated up to a temperature not lower than 600° C. A steel vessel is good enough for the former type, but the latter type requires a vessel with a refractory lining. Scrap preheating by a powdered coal burner is mainly of this high temperature type.

The characteristics required of a powdered coal burner for this kind of purpose are as follows:

The length of the flame should be short.

The temperature of the flame should be appropriately low.

Ignition and combustion should be stable.

The amount of NOx generated in the burner should be as small as possible.

Oxidation loss of heated scrap should be small.

The structure of the burner should be simple and the maintenance thereof is easy.

There are two different kinds of burners for powdered coal: one is a burner using pure oxygen, and the other is a burner using air. It was found that, since the flame temperature of a pure oxygen burner is high and the oxidizing power of the atmosphere is strong, oxidation of the scrap and unevenness of temperature of scrap is inevitable when such a burner is used for preheating scrap. Therefore, basically an air burner or an oxygen-enriched air burner should be used.

Even in an air burner, because the flame temperature is as high as 1800° C., heat loss to the refractory which forms the combustion space is high. In order to reduce this heat loss, it is necessary to make the combustion space smaller, and hence, to shorten the flame length to the utmost. As a way of shortening the flame length, it is tried to use small-sized burners with reduced fuel input and to install many of these small-sized burners in one vessel. This way of shortening the flame length has limited effect, and it is desired to provide a burner which burns with a short flame regardless of the size of burner.

SUMMARY OF THE INVENTION

Accordingly, it is an object of the invention to meet the above requirements by providing a powdered coal burner which burns powdered coal with a short flame, the temperature of which is not very high, and which is suitable for heating scrap.

The powdered coal burner of the instant invention comprises an oxygen nozzle, a powdered coal nozzle and an air nozzle which are concentrically dispersed from the center to the outside and have an open end, and a cone at the open end of the oxygen nozzle for dispersin oxygen in a radial direction for burning powdered coal.

The open end of the oxygen nozzle is enlarged in a radial direction and the inside of the powdered coal nozzle at its open end is beveled so as to disperse the powdered coal in a radial direction. Vanes can be provided in the air nozzle adjacent its open end for producing swirl.

The air nozzle is made of a double pipe for passing cooling water therein or may be coated on its outside with a refractory coating.

The cone at the open end of the oxygen nozzle may be movable forward and backward for controlling the dispersion of its oxygen.

The dispersion angle of the burning flame of the powdered coal burner of the invention is within the range of 60°±10° and the burner is used for preheating scrap prior to melting.

BRIEF DESCRIPTION OF THE DRAWINGS

The invention of the instant application will be more fully described and better understood from the following description, taken with the drawings, in which.

DETAILED DESCRIPTION OF THE PREFERRED EMBODIMENTS

Hereinunder, the preferred embodiments of the invention will be described with reference to the accompanying drawings in which parts which are identical are referred to with the same reference number.

Figure 1:
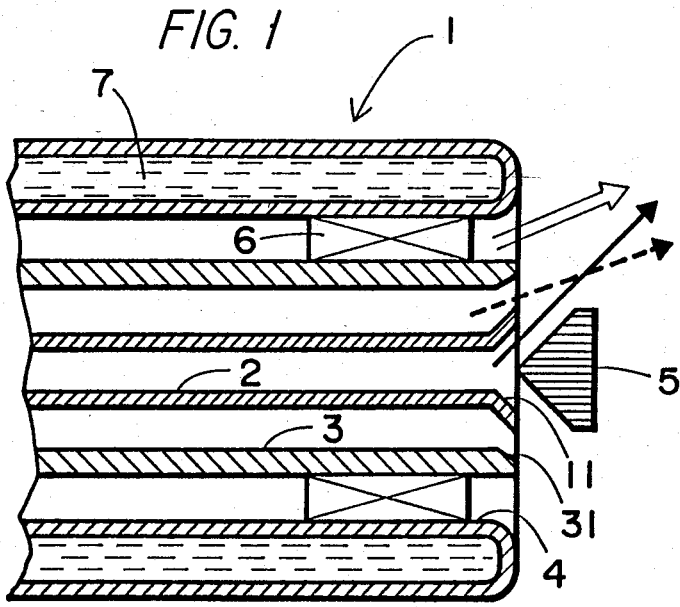
FIG. 1 is a vertical sectional view of a powdered coal burner according to one embodiment of the invention.
Figure 4:
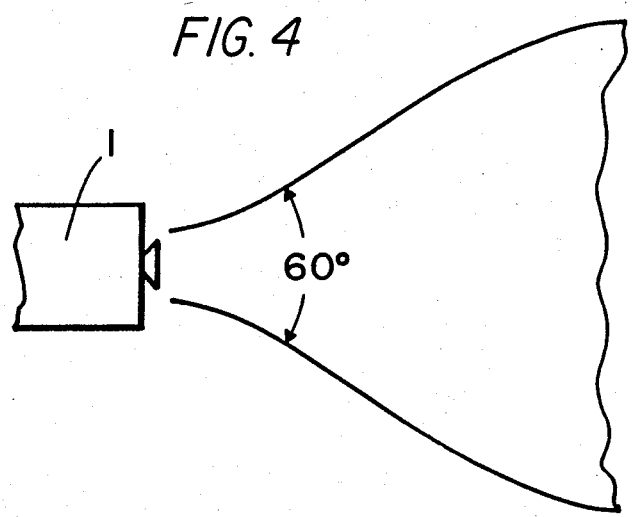
FIG. 4 is a side view of the shape of a flame when the powdered coal burner according to the invention is used.
Figure 2:
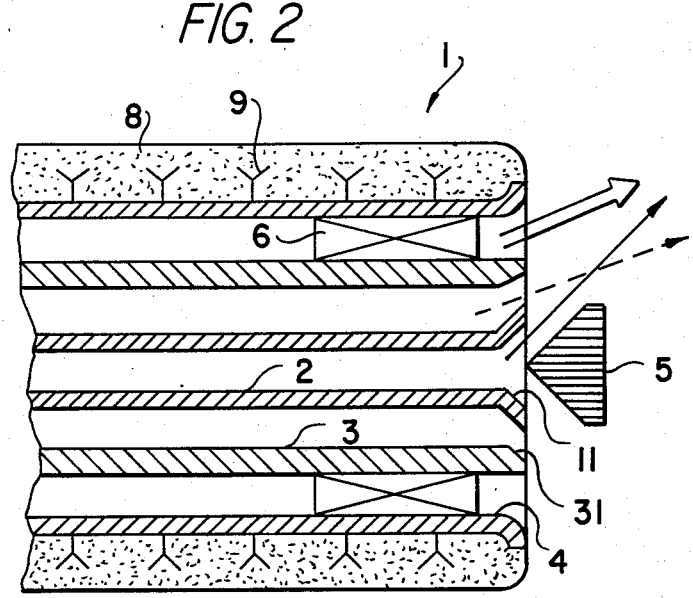
FIG. 2 is a vertical sectional view similar to FIG. 1 but showing a second embodiment of the invention.
Figure 3:
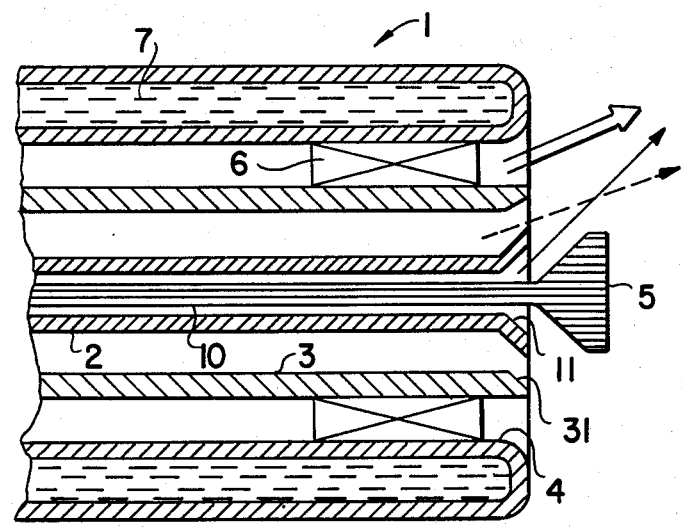
FIG. 3 is a vertical sectional view also similar to FIG. 1 but showing a third embodiment of the invention.

Referring to FIGS. 1, 2 and 3, the powdered coal burner according to the invention is composed of an oxygen nozzle 2, a powdered coal nozzle 3 and an air nozzle 4 which are disposed concentrically from the center to the outside. At the end of the opening part of the oxygen nozzle and opposed thereto a cone 5 with the shape of an inverted cone is provided in order to disperse oxygen in a radial direction as indicated by the solid line arrow and to burn the powdered coal.

What is blown out from the oxygen nozzle 2 may be oxygen enriched air or air as well as pure oxygen, and the composition of gas is selected depending on a given situation. For example, at the beginning of the ignition and heating of the burner, oxygen or oxygen enriched air is preferably used in order to stabilize the ignition and combustion. Therefore, "oxygen" means not only pure oxygen but also air and mixtures of oxygen with air in various proportions.

In preferred embodiments, shown in FIGS. 2 and 3, the end 11 of the oxygen nozzle is enlarged in a radial direction and the inside 31 of the end of the powdered coal nozzle is beveled. In this way, the flow path of powdered coal is directed in a radical direction. It is preferable to make the dispersion angle of powdered coal a little smaller than the dispersion angle of the oxygen gas which is inside the powdered coal, as is shown by the broken line arrow, such that oxygen and powdered coal may be mixed appropriately.

The air from the air nozzle which is disposed outermost is a little expanded in a radial direction by the flow of the oxygen in the central path, and the powdered coal in its neighborhood flows as is indicated by the double lined arrow. In this way, by blowing out oxygen and air so as to put the flow of powdered coal therebetween, mixing and combustion are conducted rapidly. It is also recommended to provide vanes 6 for generating swirl inside of the air nozzle, as is often the case with a burner.

If necessary, a cooling means is provided in the burner. Ordinarily, adequate cooling is achieved, as is shown in FIGS. 1 and 3, by making the air nozzle a double pipe for passing cooling water 7 therein. Unless the conditions of use are harsh, a refractory coating as shown in FIG. 2, is sufficient. The refractory coating made of castable refractory material 8 is fixed with anchors 9 on the outside of the air nozzle.

The dispersion angle of blowing oxygen from the oxygen nozzle in a radial direction is determined by a shape of the cone 5 and the relation between the position of cone 5 and the position of the end of nozzle 11. Accordingly, if the distance between the cone and the end of the nozzle is made variable, the direction of dispersion of oxygen can be made variable.

Variation of the distance between the cone and the end of the nozzle can be realized by using an adjusting rod 10 as shown in FIG. 3, which moves the cone forward and backward by means of a suitable hydraulic mechanism or threading. The rod may have a diameter the same as the inner diameter of the central pipe so as to locate the cone exactly at the center of the nozzle, and have some grooves at the surface, in the longitudinal direction, through which the gas can be blown.

The powdered coal burner according to the present invention is easy in igniting, and is able to maintain stable combustion without producing soot even under a burning condition of a slight lack of oxygen. The flame has a conial shape and is short, as shown in FIG. 2.

Having these properties, this burner displays efficacy when used for preheating scrap. This powdered coal burner is especially useful for the scrap preheating process which was invented to remarkably heighten thermal efficiency and is proposed separately by the inventors. In the scrap preheating process, scrap is preheated under a condition of a slight lack of oxygen in order that exhaust gas of a high temperature preheating may contain a small amount of CO, and, by introducing secondary air thereto by an after burner, they are subjected to low temperature preheating.

EXAMPLE

The merits described above obtained by a burner according to the invention will be shown in the following in comparison with the data of the conventional burner which blows powdered coal from the center, and primary oxygen and secondary oxygen in a double ring section from in a direction converging on the imaginary axis of blowing.

|  | Invention | Control |
|---|---|---|
| Amount of Furned Powdered Coal (kg/min) | 3.5 | 0.7 |
| Pure Oxygen Ratio | 0–0.5 | 0.7–1.0 |
| Flame Length (mm) | 1,200 | 1,200 |
| Flame Temperature (°C.) | 1,600–2,000 | 2,300 |
| NOx (ppm)[1] (oxygen ratio = 0) | 30 | 400 |
| Amount of Scrap Oxidation[2] (kg/t) | 10 | 60 |
| Thermal Efficiency (%)[3] | 46 | 50 |

[1]the value when burned under the condition that the Co content of exhaust gas is 3%.
[2]the value at a scrap temperature of 900° C.
[3]cumulative thermal efficiency at a scrap temperature of 900° C. (Oxidation heat is exempted).

Since a burner according to the invention has a simple structure, it is advantageous not merely for attaching to the lid of scrap preheating vessels which require moving but also for various usages.

The terms and expressions which have been employed in the foregoing description are used as terms of description and not of limitation, and there is no intention, in the use of such terms and expressions, of excluding any equivalents of the feature shown and described or portions thereof, but it is recognized that various modifications are possible within the scope of the invention claims.

What is claimed is:

1. A powdered coal burner comprising an oxygen nozzle, a powdered coal nozzle and air nozzle which are disposed concentrically from the center to the outside and have an open end, said oxygen nozzle being enlarged at its open end, and a cone at said enlarged open end of said oxygen nozzle for dispoing oxygen in a radial direction for burning the powered coal, said cone is movable forward and backward for controlling the dispersion angle of oxygen, said open end of said oxygen nozzle being enlarged in a radial direction and the inside of said powered coal nozzle at its open end being beveled radially outward so so as to disperse the powdered coal in a radial direction into said radially directed oxygen, said air nozzle includes a double pipe for passing cooling water therein, the outside of said air nozzle is refractory coated, and vanes for producing swirl are provided in said air nozzle adjacent its open end.

2. A powdered coal burner according to claim 1, wherein the dispersion angle of the burning flame is within the range of 60°±10°.

3. A powdered coal burner according to claim 1, which is used for preheating of iron scrap prior to melting.

* * * * *